PHILIP MARET.
Improvement in Watch-Case Springs.
No. 126,149.                                         Patented April 30, 1872.
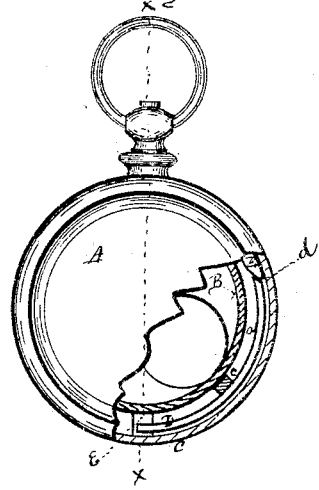
Fig: 1.
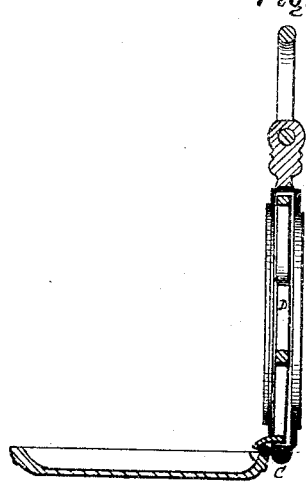
Fig: 2.
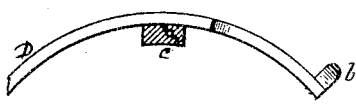
Fig: 3.
Witnesses.
Richard Gerner
Franklin Barritt.
Inventor.
Philip Maret
pr Henry Gerner
Attorney.

UNITED STATES PATENT OFFICE.

PHILIP MARET, OF BELLEVILLE, ILLINOIS.

IMPROVEMENT IN WATCH-CASE SPRINGS.

Specification forming part of Letters Patent No. 126,149, dated April 30, 1872.

Specification describing certain Improvements in Watch-Case Springs, invented by PHILIP MARET, of Belleville, State of Illinois.

The object of my invention is to supersede, by a cheaper and better device, the old or commonly-used watch-case springs. Heretobefore the spring was secured in the watch by means of a screw, and watchmakers have experienced much trouble, annoyance, and cost in removing and replacing them. My invention obviates this; more, it holds more firmly and solidly the frame upon which the works are secured—so firmly that no screws are required, which is deemed by many a decided improvement; but to describe my invention more fully I will refer to the accompanying drawing.

Figure I is a side or back view of the watch, with part of it removed or cut out in order to show my invention. Fig. II is a cut section of the same through line $x\, x$, Fig. I, having the frame to which the works are attached, and the back cases, removed. Fig. III is an enlarged detached view of the spring.

A represents an ordinary watch; B, the frame to which the works are attached. C is the rim, having a groove, $a$, running in its center. Into this groove is placed the spring D, having a curved form to match that of the rim C. The spring D has, on one of its ends, a hook-like shape, $b$, (see Fig. II;) on the other, an angular shape. At or near the center of the spring D is firmly secured a piece of brass or other metal, $c$. The difference existing between my improved spring and those in present use is not in its curved form, nor in its hook-formed end $b$, but in securing, at or near its center, the piece of metal $c$, which acts as a rest for the frame B and the spring to press against.

To apply the spring D, it is first placed into the groove $a$; the angular-shaped end is then rested upon the upper spring E at the point $d$, and the other end is passed through the groove $e$ in the rim C. The hook is then passed around the hinge F, the end of which lies, or nearly so, against the guard $e$, on the outer or front case G. The frame B is then put into its place by pressing it against the piece $c$. It will be readily seen that the spring D is not only held into its place and made stiffer when the frame B is put into its place, but the object of my invention holds, by its own elasticity, the frame B firmly into its place.

Having thus described my invention, I desire to claim—

The curved spring D, provided with the inner projecting metal block $c$, and held in the groove in watch-case by the frame B, as and for the purposes set forth.

PH. MARET.

Witnesses:
   A. C. CRONDAL,
   FRANKLIN BARRITT.